(12) United States Patent
Singleton

(10) Patent No.: US 11,305,947 B1
(45) Date of Patent: Apr. 19, 2022

(54) PASS-THROUGH CONVEYANCE SYSTEM AND METHOD

(71) Applicant: Matthew Bryon Singleton, Wheatland, MO (US)

(72) Inventor: Matthew Bryon Singleton, Wheatland, MO (US)

(*) Notice: Subject to any disclaimer, the term of this patent is extended or adjusted under 35 U.S.C. 154(b) by 0 days.

(21) Appl. No.: 17/246,607

(22) Filed: May 1, 2021

(51) Int. Cl.
| | |
|---|---|
| *B65G 47/04* | (2006.01) |
| *E06B 5/00* | (2006.01) |
| *B65G 11/14* | (2006.01) |
| *B65G 13/08* | (2006.01) |

(52) U.S. Cl.
CPC ............ *B65G 47/04* (2013.01); *B65G 11/143* (2013.01); *B65G 13/08* (2013.01); *E06B 5/00* (2013.01); *B65G 2249/02* (2013.01); *Y10S 198/95* (2013.01)

(58) Field of Classification Search
CPC ..... Y10S 198/95; B65G 47/04; B65G 11/143; B65G 2249/02; B65G 13/08; E06B 5/00
USPC ......... 198/950, 506; 414/217, 147, 162, 179
See application file for complete search history.

(56) References Cited

U.S. PATENT DOCUMENTS

| | | | | |
|---|---|---|---|---|
| 4,753,337 A | * | 6/1988 | Grosjean ................... | F27B 9/38 198/950 |
| 5,280,983 A | * | 1/1994 | Maydan ................... | H01L 21/67 414/217 |
| 6,304,629 B1 | * | 10/2001 | Conway ................. | G01N 23/04 378/68 |
| 10,159,169 B2 | * | 12/2018 | Vincent ................ | H05K 13/021 |
| 2010/0313809 A1 | * | 12/2010 | Guo ....................... | C23C 14/566 414/217 |
| 2012/0063869 A1 | * | 3/2012 | Igarashi ............ | H01L 21/67772 414/217 |
| 2015/0221538 A1 | * | 8/2015 | Ochiai ............. | H01L 21/67772 414/217 |
| 2015/0321356 A1 | * | 11/2015 | Vijverberg .......... | H01J 37/3177 414/217 |

FOREIGN PATENT DOCUMENTS

CN          113319211       *    8/2021    ............. B65G 11/14

* cited by examiner

*Primary Examiner* — James R Bidwell
(74) *Attorney, Agent, or Firm* — Baker Law Firm; John Baker; Jeffrey Roddy

(57) ABSTRACT

A pass-through conveyance system and method includes a main assembly comprising at least a platform that is translatable along a radius and movable between two separate environments, an opening between the two separate environments and at least one opening sealing member. The platform is adapted to receive an object; e.g, article, container or package, loaded thereon from a first environment by manual or mechanical ways and translate the object through an opening to a second environment.

12 Claims, 11 Drawing Sheets

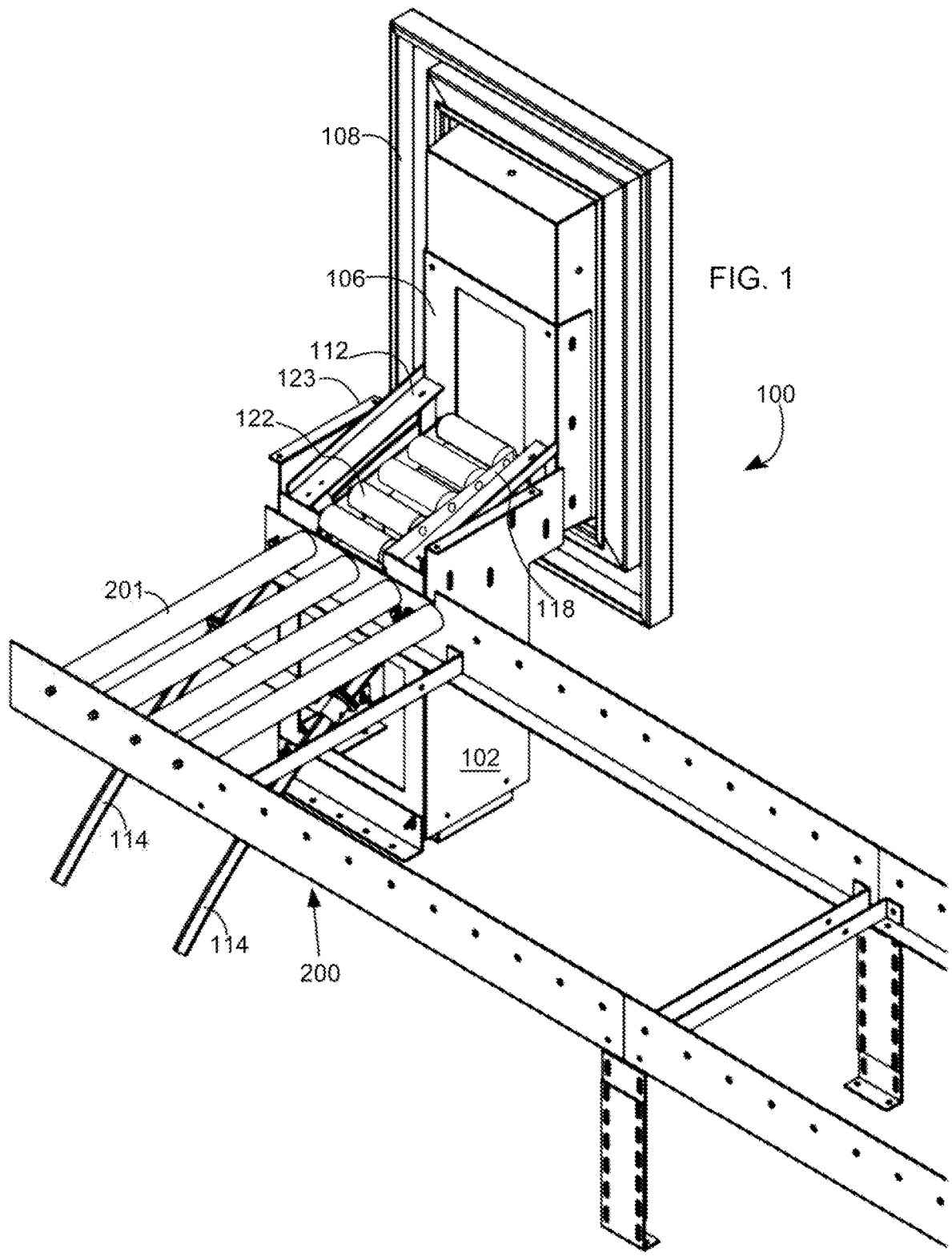

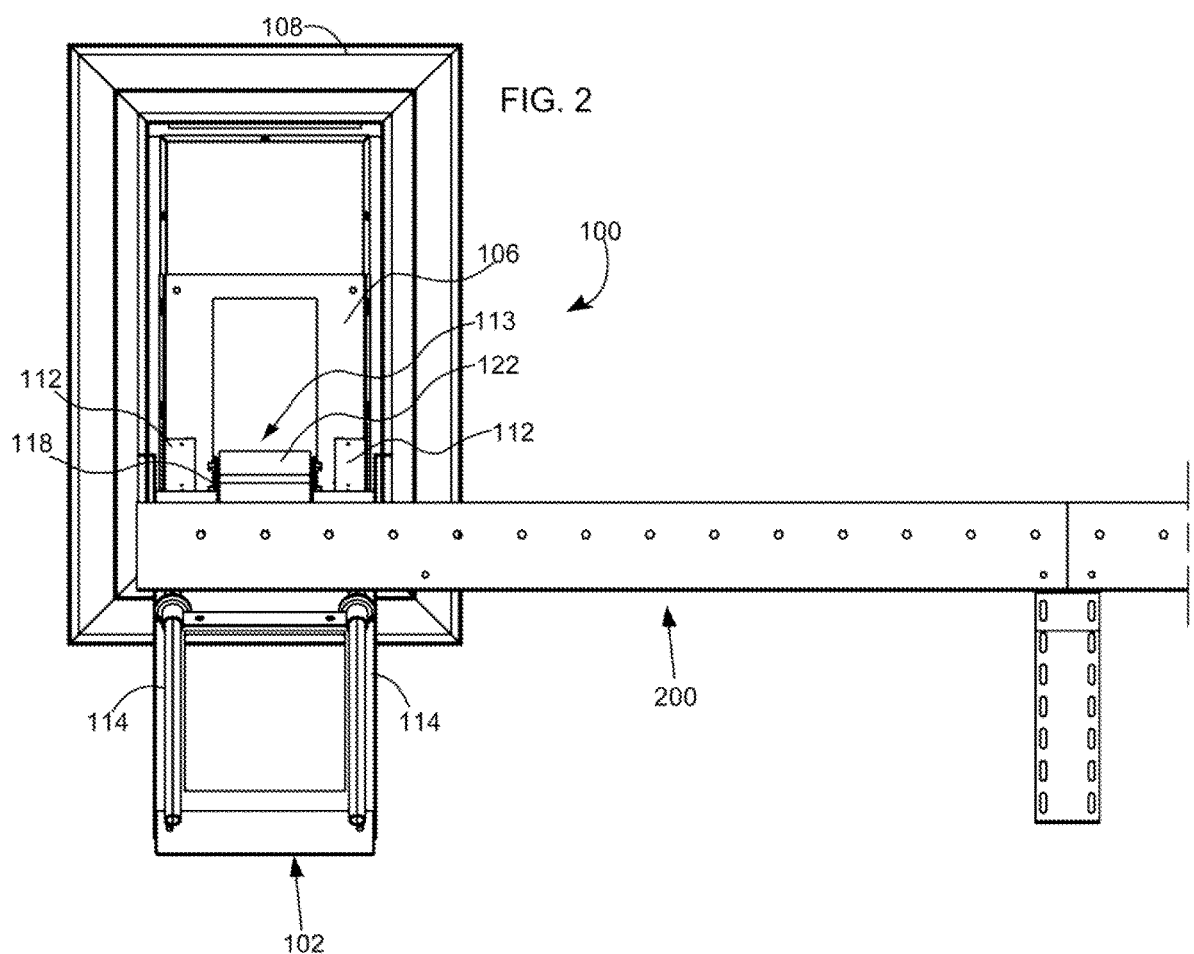

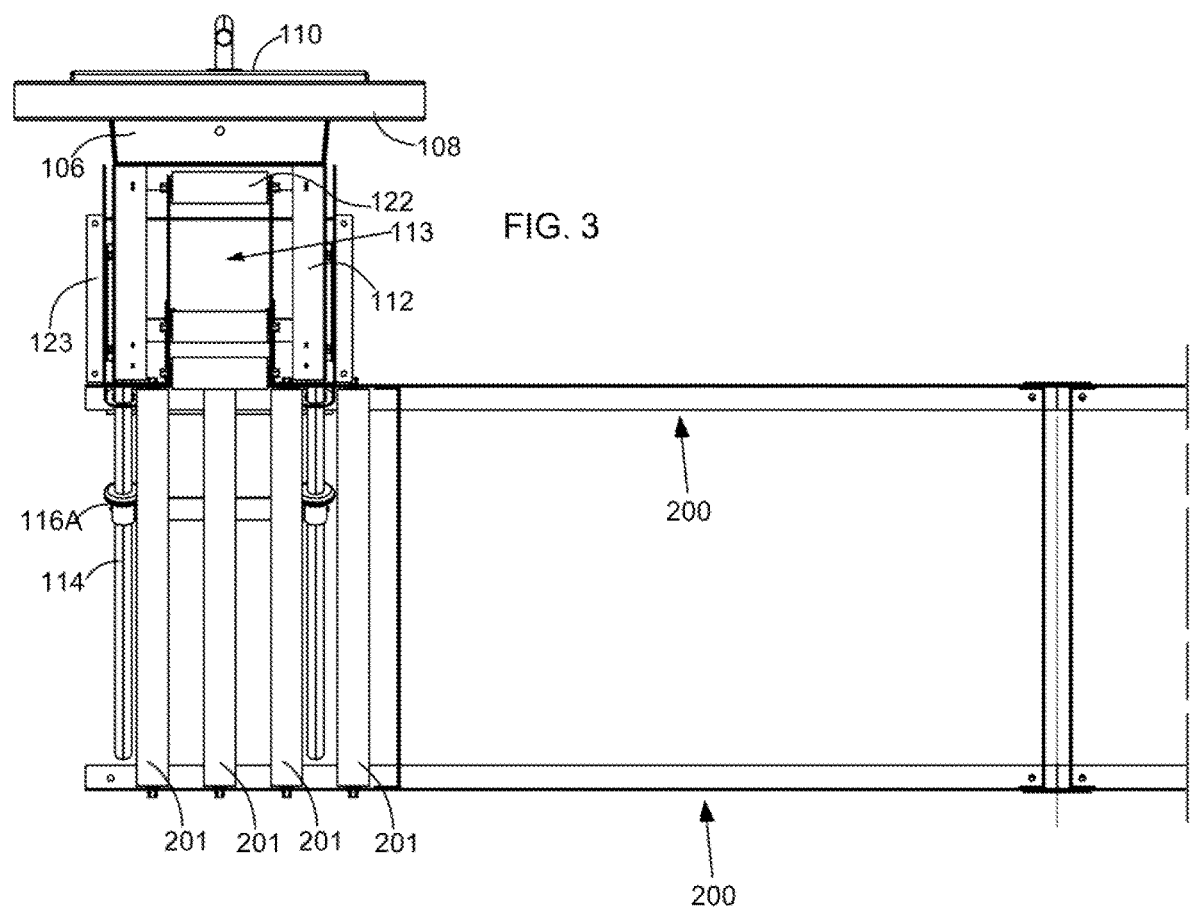

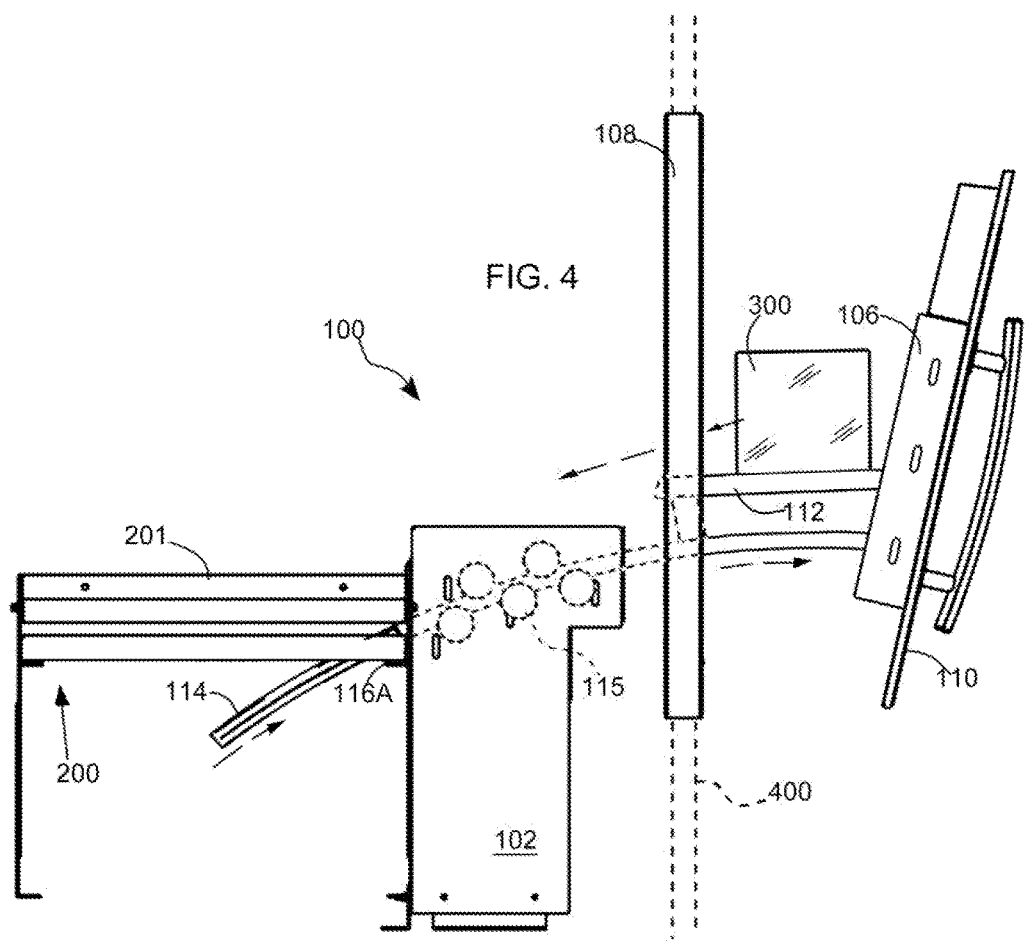

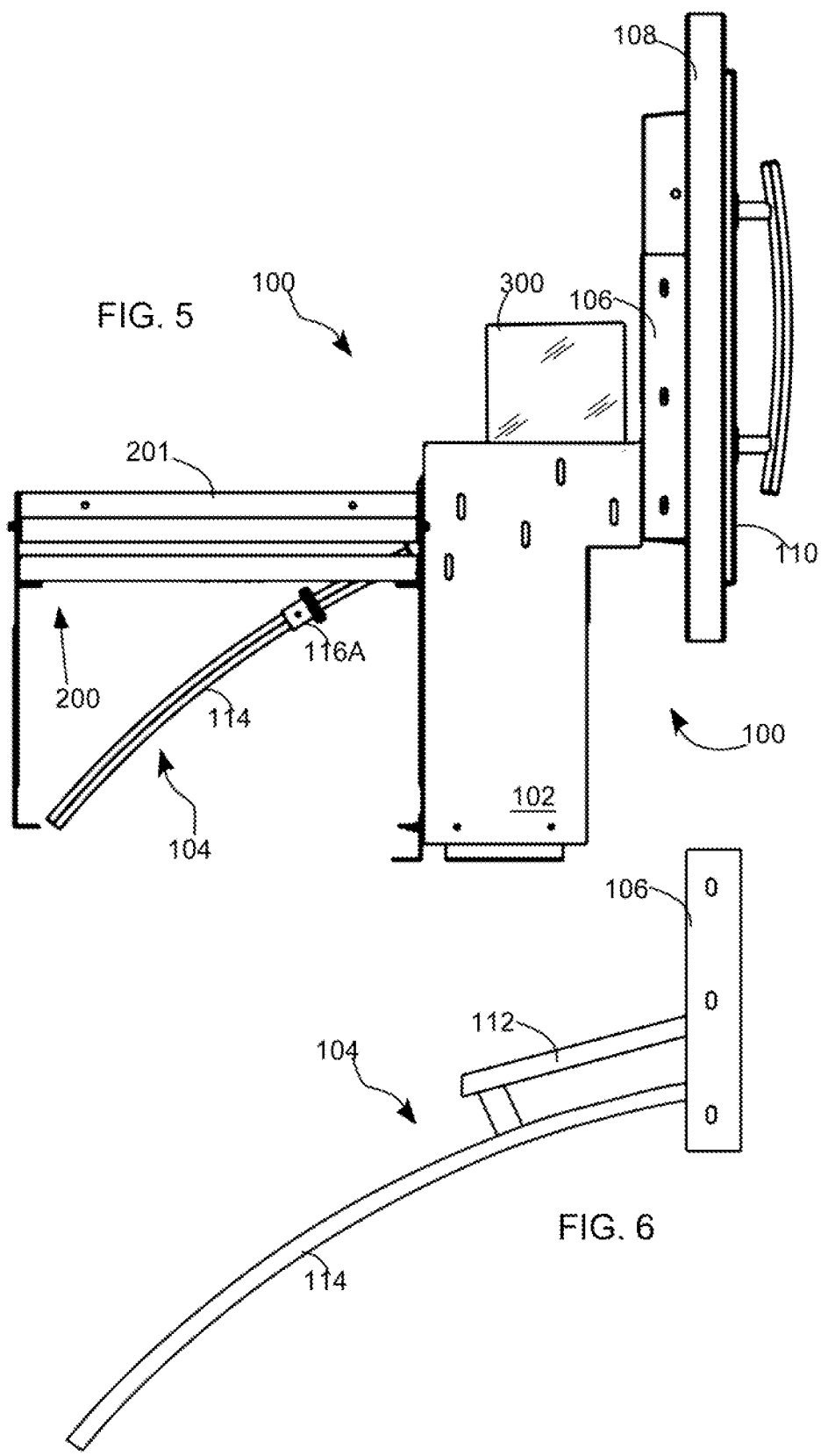

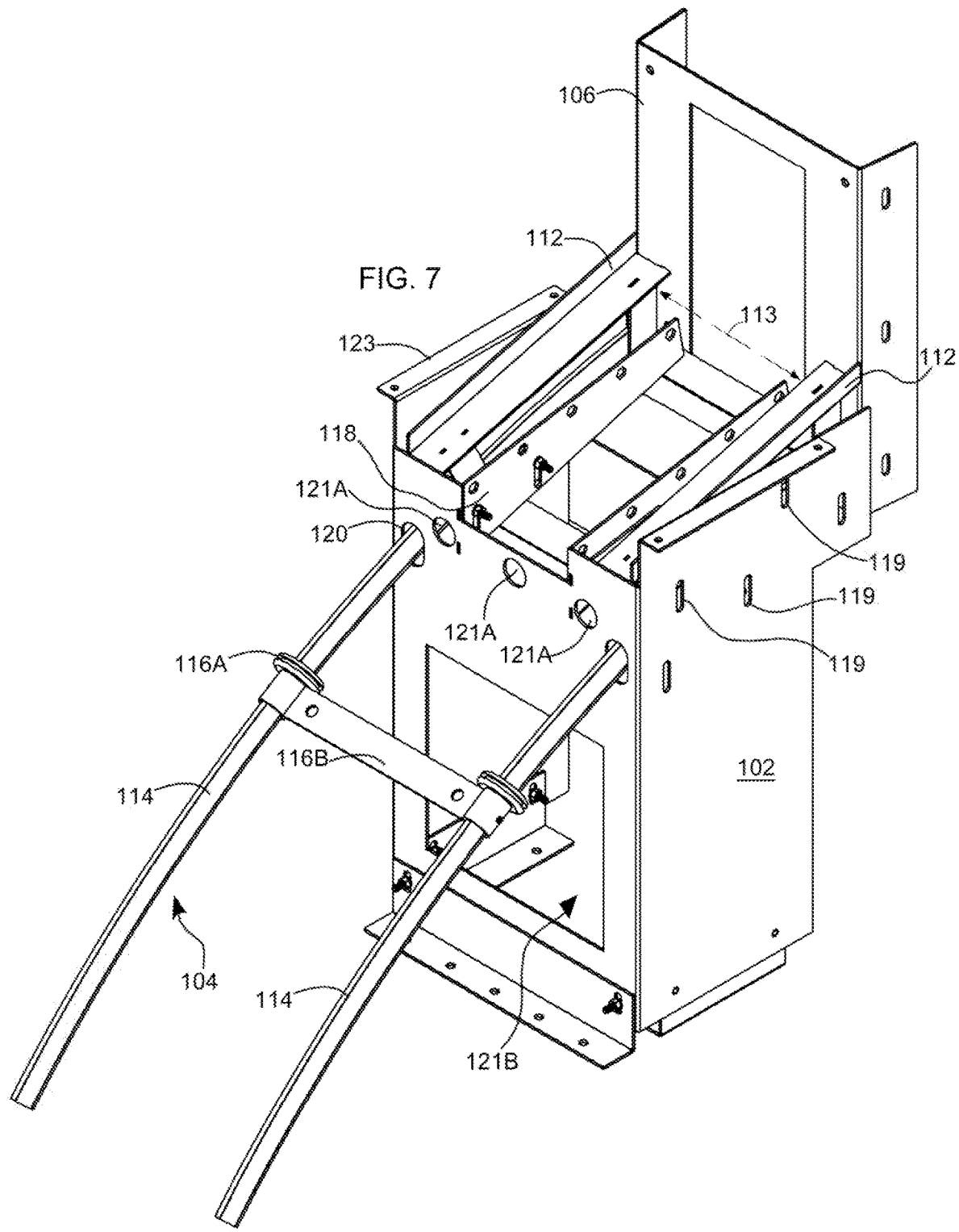

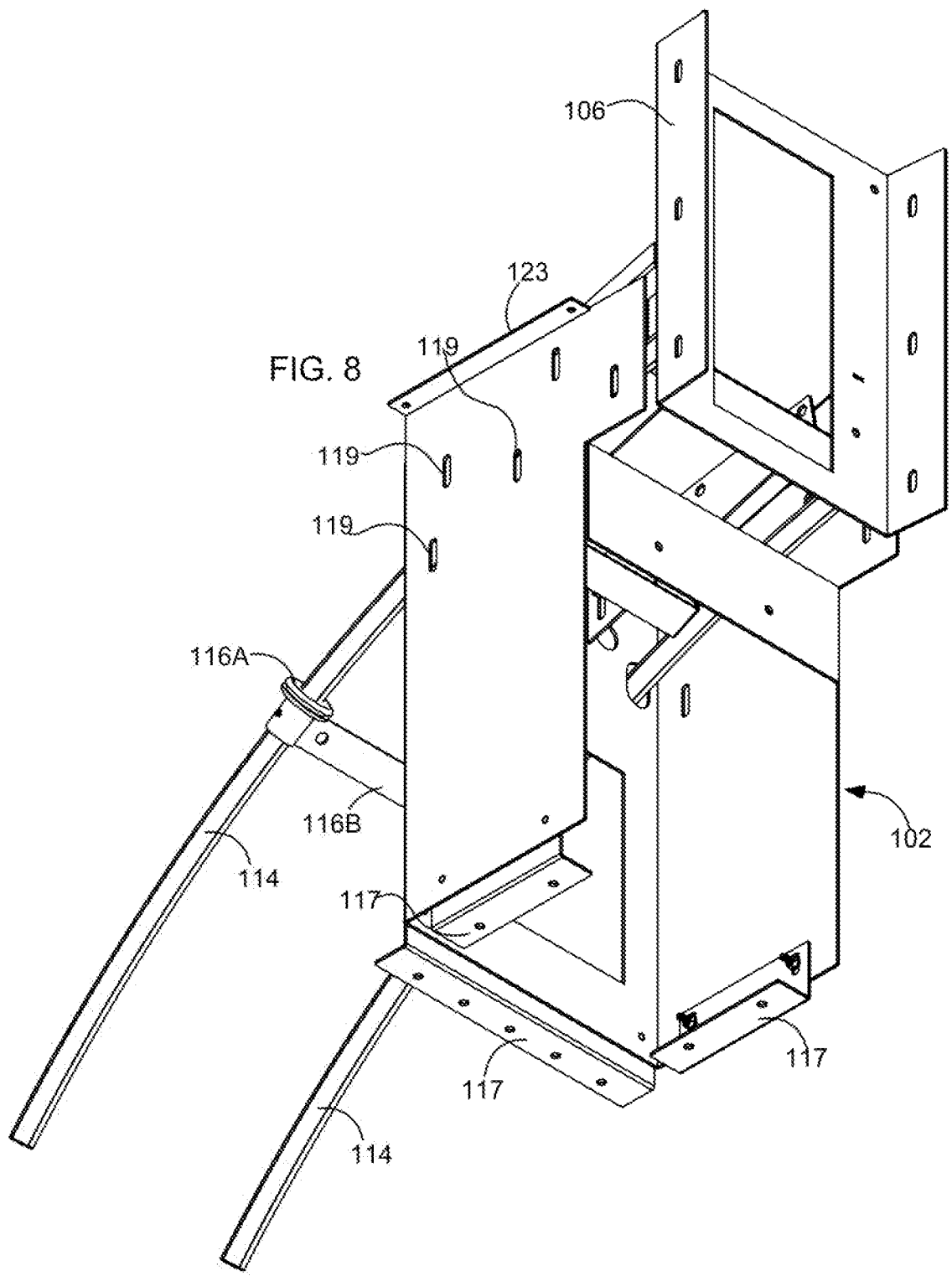

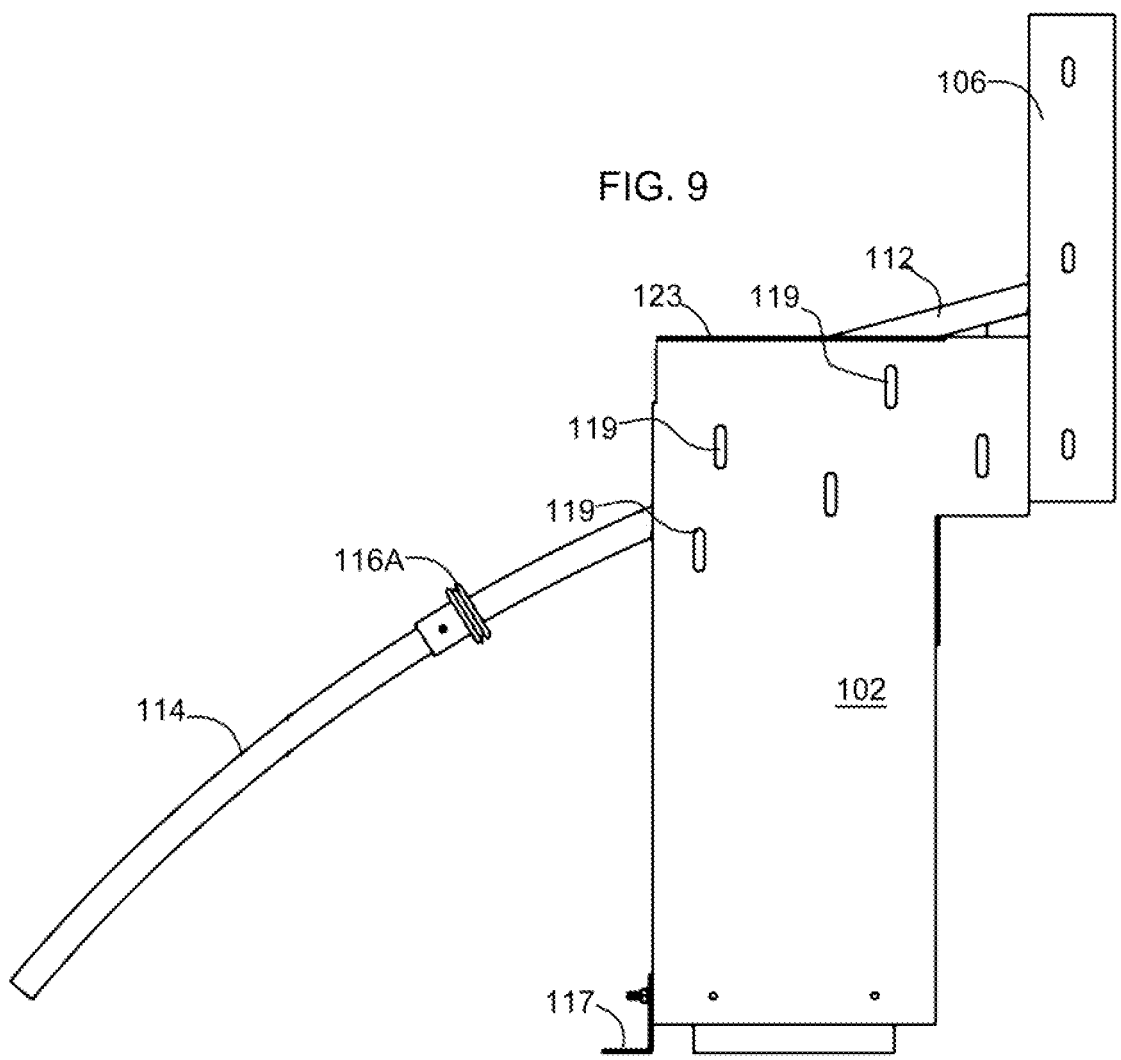

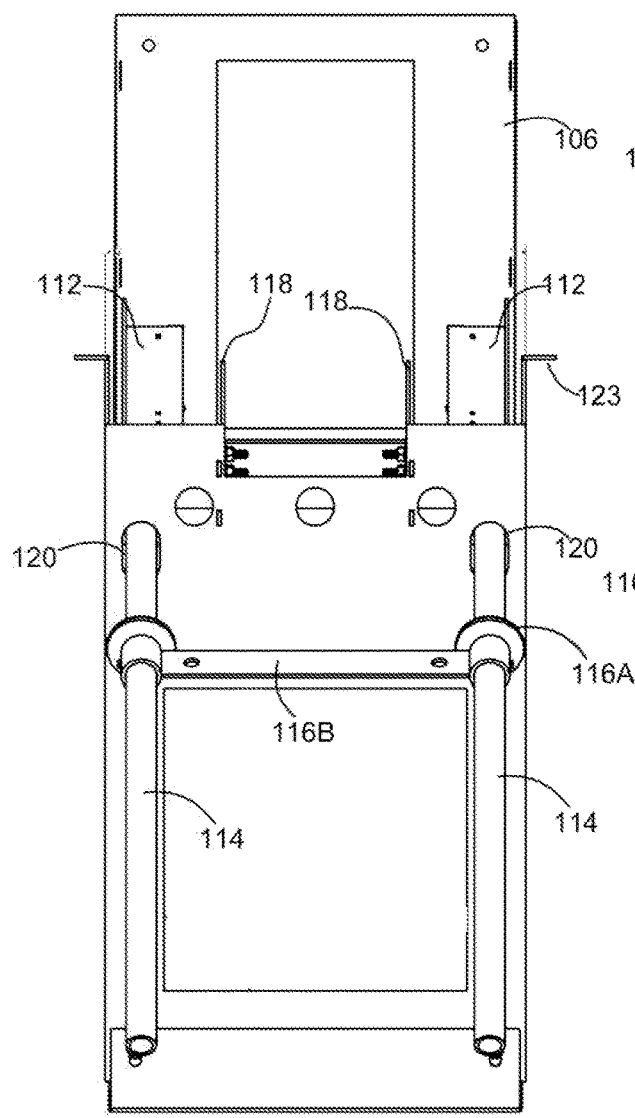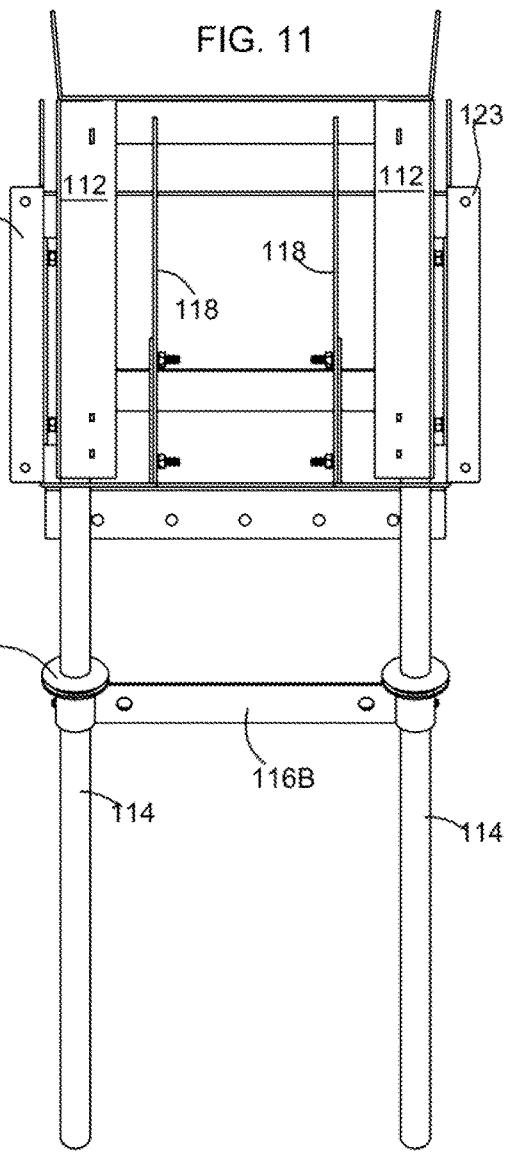

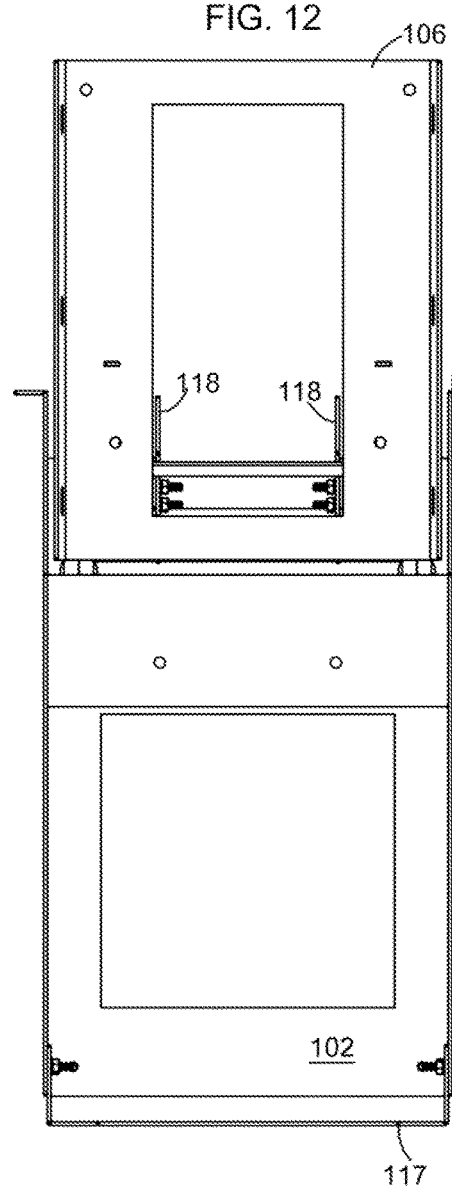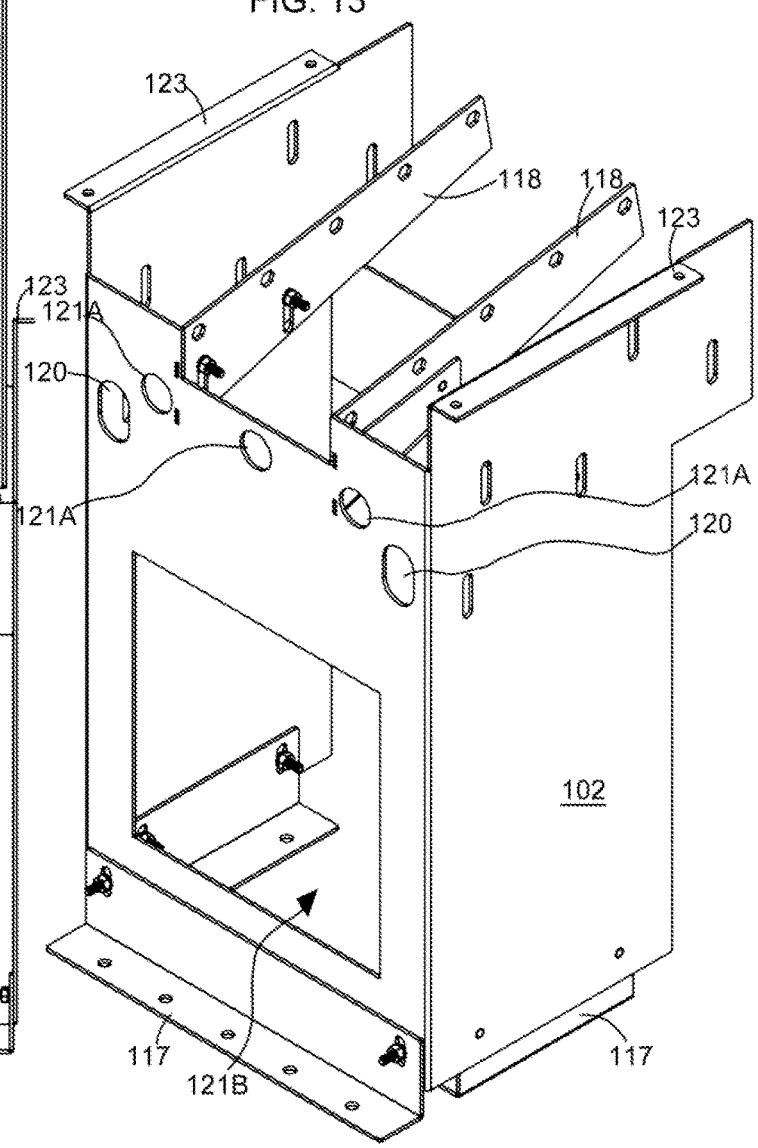

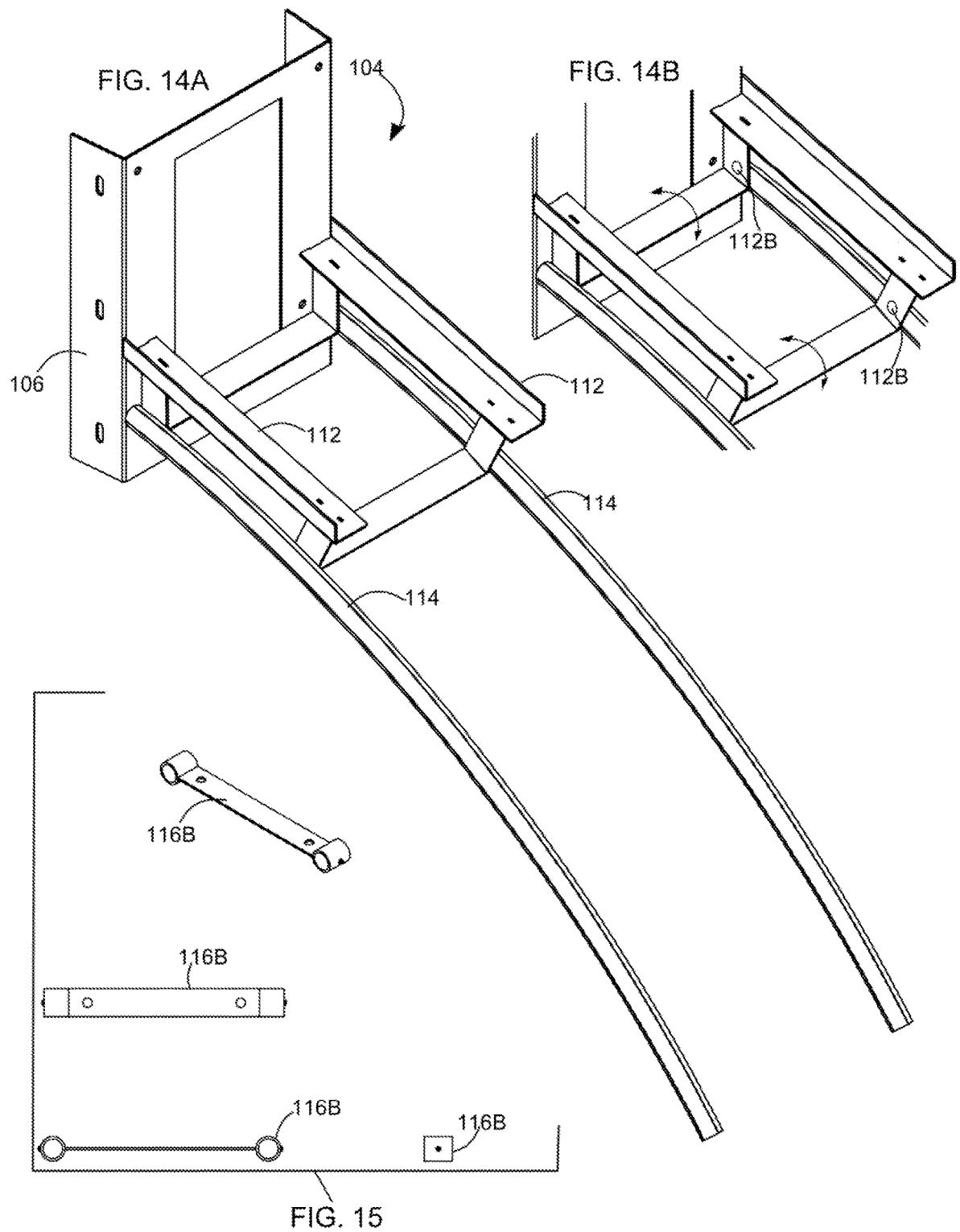

PASS-THROUGH CONVEYANCE SYSTEM AND METHOD

FIELD

The invention relates generally to conveyance systems for articles, containers and packages.

BACKGROUND

In a production or shipping environment, transferring packages between environmentally segregated spaces can be a complicated and costly process. Various machines and methods intended for new construction conveyance systems or retrofitting to existing conveyor apparatus disclosed herein provide for an efficient and cost effective transfers of articles, containers and packages where it is necessary to prevent or control temperature or pressure creep between two environments.

It would be desirable to provide a system that may be readily added to an in situ conveyor system that allows the transfer of articles, containers and packages of various kinds from one environment to another while retaining continuity of a production process.

It would be desirable if the foregoing retrofitable system included an assembly with sub-assemblies that may be placed directly adjacent to an existing conveyor; e.g., package roller conveyor.

It would further be desirable for such a retrofitable system to be included in a portal between adjacent but environmentally segregated spaces.

It would be even further desirable for such a device to include a pass-through platform configured to receive and transfer articles, containers and packages between the environmentally segregated spaces.

SUMMARY

Various implementations permit an operator to safely and efficiently transfer an object, article, package or container from one environment to another and minimize contamination e.g., thermal flow, between the environments. Examples include loading transferring comestibles to a hot oven or transferring cleaned fish to a blast freezer without losing the level of quality to the product or exposing a worker to an unsafe environment. In one general example implementation according to the present disclosure, a pass-through conveyance system and method includes a main assembly comprising of at least a platform that is translatable along a radius and movable between two separate environments, an opening between the two separate environments and at least one opening sealing member. The platform is adapted to receive an object; e.g, article, container or package, loaded thereon from a first environment by manual or mechanical means and translate the object through an opening to a second environment.

In an aspect combinable with the foregoing example implementation, the first and second environments may be differentiated by temperature, air pressure or other factor.

In an aspect combinable with any aspect described herein, the platform has at least two termini; one terminus for the receiving of an object and another terminus at the intersection with another conveyance apparatus.

In an aspect combinable with any aspect described herein, the platform is configured to translate along a curved path.

In an aspect combinable with any aspect described herein, the platform may be linked to a movable component having a radius.

In an aspect combinable with any aspect described herein, the platform may move with the foregoing movable component.

In an aspect combinable with any aspect described herein, the foregoing movable component may include one or more curved rails or tracks.

In an aspect combinable with any aspect described herein, the one or more curved rails or tracks may be supported by a cabinet and one or more bearing components.

In an aspect combinable with any aspect described herein, various example implementations may include a ramp or tiltable member to transition an object onto a secondary conveyance assembly.

In an aspect combinable with any aspect described herein, pass-through assembly may log time or date to reflect operational times, in and out timestamps and various metrics and data logging related to operational status.

In an aspect combinable with any aspect described herein, various implementations may include an intermediary chamber; eg., anteroom, plenum, vestibule, etc., between the two separated environments.

In an aspect combinable with any aspect described herein, various implementations may include a bellows that moves with the platform;

In an aspect combinable with any aspect described herein, travel distance of any curved rail or track may be adjustable with the use of stops.

In an aspect combinable with any aspect described herein, the system may include a fail safe operational means in case of power outage.

In an aspect combinable with any aspect described herein, the system may include a scale to determine the weight of object contents.

In an aspect combinable with any aspect described herein, the system may include an audible or silent alarm to alert on operational status.

In an aspect combinable with any aspect described herein, the system device may include a motion sensor.

In an aspect combinable with any aspect described herein, the at least one sealing member may include a door attached to or engageable with the movable platform.

In an aspect combinable with any aspect described herein, the at least one sealing member may include one or more doors, flaps, curtains or other objects adapted to slow thermal transfer between the segregated environments.

BRIEF DESCRIPTION OF THE DRAWING FIGURES

FIG. 1 is a perspective view of one implementation of a pass-through conveyance system according to the present invention;

FIG. 2 is a front elevation of the implementation shown in (FIG. 1);

FIG. 3 is a top plan view of the implementation shown in (FIGS. 1 and 2);

FIG. 4 is a side elevation view thereof showing rail v-rollers in dashed line;

FIG. 5 in combination with (FIG. 4) show a transition of a package between two environments separated by portal (108);

FIG. 6 is a side view of one implementation of a curved rail sub-assembly;

FIG. 7 is a front perspective view of the curved rail sub-assembly shown in (FIG. 6) integrated with a cabinet sub-assembly;

FIG. 8 is a back perspective view thereof;

FIG. 9 is a side elevation showing assembled cabinet sub-assembly (102) with curved rail sub-assembly (104);

FIG. 10 is a front side elevation thereof;

FIG. 11 is a top plan view thereof;

FIG. 12 is a back side elevation thereof;

FIG. 13 is a perspective view of a cabinet sub-assembly;

FIG. 14A is a perspective view of the curved rail sub-assembly;

FIG. 14B is a partial perspective view of another implementation of the example curved rail sub-assembly;

FIG. 15 is a grouping showing a cross-member in various views.

REFERENCE LISTING OF THE NUMBERED ELEMENTS 100 pass-through assembly
102 cabinet sub-assembly
104 curved rail sub-assembly
106 door attachment member
108 portal framework
110 door
112 platform
112B pivot link/attachment member
113 gap
114 curved rail
115 v-roller
116A rail sub-assembly stop
116B crossmember
117 cabinet feet
118 roller mount bracket
119 adjustment slots
120 cabinet rail aperture
121A conveyor relief apertures
121B cabinet aperture
122 intermediary support assembly
123 delivery shield mounting flange
200 secondary conveyance
201 roller
300 object/package
400 partition Definitions In the following description, the term "platform" refers to an element capable of receiving and supporting an object. The term "conveyance" means materials and machines capable of moving objects from one location to another, and especially conveyor type machinery such as roller conveyors used in processing, manufacturing or fulfillment centers. The term "object" as used herein, means any article, container, or package. The term "segregated" means separated where the separation may be a wall or partition separating two spaces or separating a first space from a second space. Furthermore, separation may include a temperature or air pressure difference between environments, may include relatively tight sealing members and relatively loose sealing members and hence, generally a degree of fluid impedance. The term "retrofittable" means adapted to connect to—or interface with pre-installed equipment, and especially pre-existing conveyance apparatus. Unless otherwise explained, any technical terms used herein have the same meaning as commonly understood by one of ordinary skill in the art to which this disclosure belongs. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references listed in this disclosure are incorporated by reference in their entirety for all purposes. In case of conflict, the present specification, including explanations of terms, will control. In addition, the materials, methods, and examples are illustrative only and not intended to be limiting.

DETAILED DESCRIPTION OF THE EMBODIMENTS

Referring to FIGS. 1-15, a pass-through assembly (100) includes a cabinet sub-assembly (102) configured to support and guide movement of an arced construction. Curved rail sub-assembly (104) is cantilevered and includes a pair of curved rails (114), a platform (112) and a door attachment member (106). Door (110) or a panel is generally attached to curved rail sub-assembly (104) via door attachment member (106) and may be manually operated. Cabinet feet (117) permit attachment of cabinet sub-assembly (102) to a floor surface adjacent to a secondary conveyor (200) which may be a roller conveyor or any other conveyance in a typical production setting. In other installations, the pass-through assembly (100) may feed directly into various other settings such as a freezer or an oven. In various other implementations, if sufficient structural support is present, it is possible the cabinet sub-assembly (102) may be attached directly to a wall circumjacent an opening framed by portal framework (108). In the particular implementation depicted, curved rails (114) of the curved rail sub-assembly (104) include a radius that is slidably supported by v-rollers (115) (FIG. 4) indicated in dashed line, mounted to the inside cabinet sub-assembly (102) which permit the rail pair to move in a smooth arcing motion from a first position on one side of a portal/opening to a second position on the other side of a portal/opening. In some implementations, the v-rollers may be replaced with an adjustable cartridge that allows for adjustment of the support angle of the rails and hence the ability to alter the terminating height of the platform respective of the cabinet sub-assembly or a floor surface. For purposes of this disclosure, "first position," as shown in (FIGS. 5-6), is correlated to an unextended position where platform (112) is disposed above cabinet sub-assembly (102) and "second position," as shown in (FIG. 4), is understood to be a fully extended position prompted by opening door (110). Disposed between platform gap (113) is an intermediary support assembly (122) which may be a group of aligned rollers mounted to roller mount brackets (118), a roller bearing rack, a planar low friction material or any other conveyance method that would suggest itself to one having skill in the art and access to this disclosure. Intermediary support assembly (122) may be fixed in an inclined position as shown, or may be under spring tension and transition/tilt into a relatively non-inclined position when sufficient weight is applied. Relative positions of both platform (112) and intermediary support assembly (122) may be adjusted such that when platform (112) is unextended, rollers of the intermediary support assembly (122) are set slightly higher than portions of the platform (112)

such that the bottom of a transferred package (300) may contact the rollers and according to the tilt of the intermediary support assembly (122) may be prompted to move onto secondary conveyance (200) for further processing.

While the curved rails in the particular implementation shown are cylindrical, other materials with different profiles may be used such as curved bar stock, rectangular channel, etc., without departing from the present invention.

FIGS. 1-3 show respectively a perspective view, a front side elevation and a top plan view of the pass-through assembly (100) adjacent a secondary conveyor (200) for exemplary illustration. It should be understood that the pass-through assembly may be placed adjacent other types of conveyors or feed packages directly into an enclosure or space where the packages are mechanically or manually off-loaded for further processing. Portal framework (108) is shown surrounding an opening in a wall or partition (400) which forms a passageway through which packages are transferred.

Moving to FIGS. 4 and 5, a typical transfer process is depicted. In FIG. 4, the rail sub-assembly is shown in an extended position and a package (300) has been placed atop platform (112) which may comprise angular sections with package receiving lips separated by a gap (113). In FIG. 5, the curved rail sub-assembly (104) and platform (112), best shown in FIGS. 4 and 6, have been moved forward, transferring package through portal (108), and from one environment to another. In various implementations, gap (113) (see FIG. 7) may be adjusted to vary the gap width in order to accommodate different sized packages. It should be understood that the package (300) is relatively elevated when placed atop platform (112) and transitionably lowered into the other environment/space over intermediary support assembly (122).

FIG. 7 depicts the pass-through assembly (100) including the cabinet sub-assembly, and the curved rail sub-assembly. Platform gap (113) exposes the roller mount brackets (118) where portions of the intermediary support assembly (122) have been removed for purposes of clarity to show underlying construction. Because the package receiving portions of platform (112) are disposed to the sides of roller mount brackets (118), the height of the platform in relation to the rollers of the support assembly may be adjusted by changing the position of the roller axles on roller mount brackets (118).

FIG. 8 depicts a rear oriented perspective view of pass-through assembly (100) comprising where the v-rollers (115) supporting the rail pair have been omitted for purposes of clarity to show the passing through of the cantilevered curved rail sub-assembly (104). FIGS. 9-11 show respectively, a side elevation showing platform (112) in a non-extended position, a front side elevation and a top plan view that show the arrangement of the components. Also shown are rail sub-assembly stops (116A) which may be placed in parallel with the assistance of crossmember (116B) along the length of the curved rails (114) to adjust the extension limit thereof.

FIGS. 12 and 13 show respectively, a front side elevation and perspective views of cabinet sub-assembly (102) where the curved rail sub-assembly (104) has been omitted for purposes of clarity to show structure of the cabinet which is of sufficiently rigid construction for the intended use.

FIG. 14A is a perspective view of the curved roller sub-assembly (104) showing the rail pair (114), platform (112) and door attachment member (106) which may include one or more flanged portions for ready attachment to a door (110). FIG. 15 includes several views of crossmember (116B).

Further ramifications of the present invention are the bidirectional travel of the curved rail sub-assembly (104) that may move articles and packages (300) back and forth from and into and out of adjacent segregated environments, the possibility of recessing the cabinet (102) and rail sub-assemblies (104) partially below grade, and the capability of (1) adjusting the v-rollers (115) to alter the height of the platform (112) in its resting state on either side of an enclosure, and the (2) capability of platform (112) to self level. In order to be self-leveling a link or attachment member (112B) (FIG. 14B) joining the platform (112) to the rails (114) may permit any structure joining the platform to the curved rail sub-assembly to be movable/pivotable; e.g., in some implementations, a servo actuated universal joint paired with an accelerometer and a microcontroller can assure that the platform (112) is level throughout the arcing transition from one terminus to the other. The platform (112) may be configured to depress automatically when it is at its travel limit so that it moves out of the way and a supported package (300) is placed on a conveyor element thereby allowing the conveyed package (300 to roll or slide into another conveyance (200) conduit. Although the particular implementation illustrated in this disclosure is manually operable, persons having skill in the art will appreciate that the pass-through assembly (100), may be powered such that a button may open or close door (110). The present invention may be sized and positioned to transport larger items such as pallets as for example, into and out of refrigerated environments. The curved rail sub-assembly (104) may be manually loaded, gravity fed or mechanically loaded.

The pass-through conveyance system (100) may be configured to be fully manually operated or include some automation such as push button door opening or closure, package weight sensors typically placed on the contacting surfaces of platform (112), temperature sensors to measure any temperature differential between the two segregated environments, or timing devices to alter the inclination of the intermediary support assembly (122). Any of the foregoing sensors and devices may communicate with a controller for optimized package (300) transfer. Accordingly, it is intended that this disclosure encompass any further modifications, changes, rearrangements, substitutions, alternatives, design choices, and embodiments as would be appreciated by those of ordinary skill in the art having benefit of this disclosure, and falling within the spirit and scope of the following claims.

What is claimed is:

1. A pass-through conveyance system comprising:
   a platform configured to receive an object placed thereon, the platform movable from least a first position within one of two environmentally separated spaces and a second position within another of the two environmentally separated spaces;
   a curved rail sub-assembly connected to the platform;
   a cabinet sub-assembly configured to support and guide the movable platform in an arcing motion;
   a door member attachable to the rail assembly configured to open and close and thereby form pass-through access between the two environmentally separated spaces.

2. The pass-through conveyance system according to claim 1, the door member including a fully extended and open position wherein the platform is in a ready state to receive the object.

3. The pass-through conveyance system according to claim 1, platform in the first position at a different height than the platform in the second position.

4. The pass-through conveyance system according to claim 1, the door member including a fully closed position.

5. The pass-through conveyance system according to claim 1, the door configured to translate the platform from the first position to the second position.

6. The pass-through conveyance system according to claim 1, the cabinet sub-assembly including an object contacting surface with friction reduction elements.

7. The pass-through conveyance system according to claim 1, the platform including a pair of object seats with a gap therebetween.

8. The pass-through conveyance system according to claim 1, the platform configured to lower an object onto a sloped surface, the sloped surface disposed between portions of the platform.

9. The pass-through conveyance system according to claim 1, further comprising an anteroom or bellows.

10. A method of transferring an object from a first space to a second space comprising the steps of:

providing a platform configured to receive an object placed thereon, the platform movable from least a first position within one of two environmentally separated spaces and a second position within another of the two environmentally separated spaces;

providing a curved rail sub-assembly connected to the platform;

providing a cabinet sub-assembly configured to support and guide the movable platform in an arcing motion;

placing an object on the platform in the first position;

sliding the rail sub-assembly and platform in an arcing motion to the second position;

depositing the object on a tiltable surface;

sliding the object onto a conveyance.

11. The method according to claim 10 further comprising providing a door connected to the rail sub-assembly.

12. The method according to claim 10 further comprising providing an air pressure differential between the two environmentally separated spaces.

* * * * *